Patented July 22, 1930

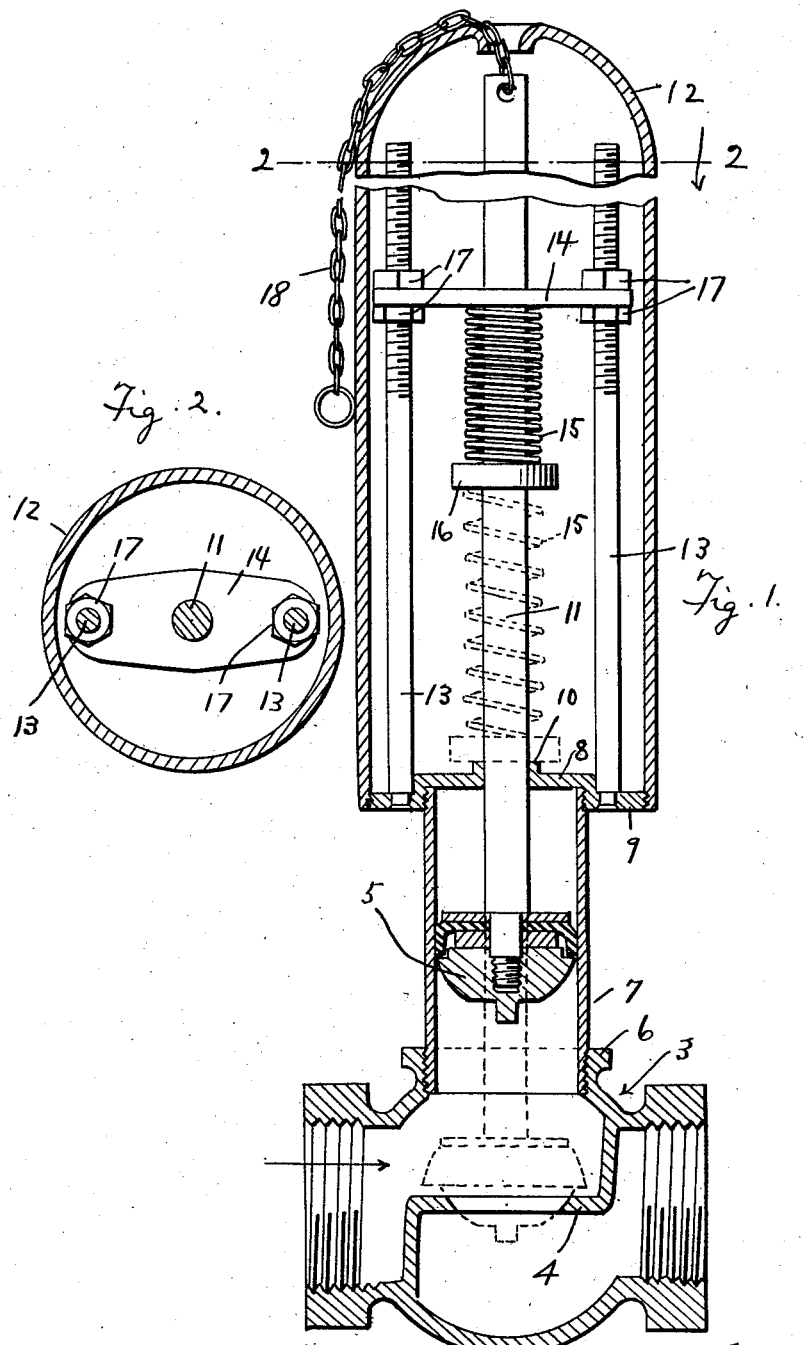

1,771,122

UNITED STATES PATENT OFFICE

TED R. JAY, OF COLEMAN, TEXAS

SAFETY GAS VALVE

Application filed October 1, 1928. Serial No. 309,399.

This invention relates to an improved automatic pressure safety valve which is especially adapted to be incorporated in illuminating gas lines, the same being principally intended for use in domestic pipe lines in residential homes and the like.

The novelty is based upon a structural arrangement wherein the valve remains open as long as the gas pressure is normal or excessive, but closes when the gas pressure becomes dangerously low, whereby to close the line and to prevent the escape of gas through burners and jets.

The particular structural details cooperating to produce this desirable result will become more readily apparent from the following description and drawings.

In the drawings:

Figure 1 is a central sectional view through the complete valve structure.

Figure 2 is a horizontal section taken on the plane of the line 2—2 of Figure 1.

Referring now to the drawings by reference numerals it will be seen that 3 designates the body of the valve which is of customary globe design and which is screw threaded for connection to pipe sections in the gas pipe line and provided with an internal partition or diaphragm 4 with which the valve head 5 cooperates. In accordance with the invention, the body 3 has a special top nipple 6, with which a tubular valve guide 7 is connected. It is in this guide that the valve head 5 slides. A closing plate 8 is threaded on the upper end of the tubular guide 7 and has an annular extending screw threaded flange 9, as well as a central guide hole 10, through which the valve stem 11 slides.

Valve closing spring means is associated with the projecting portion of the valve stem. It is confined in a vertically elongated casing 12, screw threadedly mounted on the flange 9. Extending up from this flange at diametrically opposite points and located in the casing are threaded rod members 13, on which a cross head 14 is mounted. The central portion of the cross head is slidable on the valve stem, and the cross head provides an abutment for the upper end of the coil spring 15 which surrounds the valve stem and bears at its bottom against a stop flange 16 on the valve stem. The cross head is adjusted through the medium of cooperating nuts 17, threaded on the screw threaded upper end of the guide rod members 13. A ring chain 18 is connected with the valve stem and extends out through an opening in the crown portion of the casing 12, for manually unseating the valve when desired.

When the pressure in the gas line is normal or even excessive, the valve 5 is unseated, and assumes the position shown in full lines in Figure 1. When, however, the pressure becomes exceedingly low, the spring closing means is sufficient to seat the valve as shown in dotted lines, thereby cutting off the supply of gas to the furnace and other appliances. The pressure of the spring can be regulated by adjusting the cross heads in an obvious manner.

With this arrangement, it is evident that by having a safety pressure valve in the gas line near the source of supply, the chances of asphyxiation by gas are minimized. It is well known that in many instances, during the night, when gas heaters and burners are left lighted, the pressure in the line becomes so low as to allow the light to go out. Then when the pressure resumes normalcy again, it becomes dangerous, in that it escapes into the room and endangers the lives of the occupants. With a valve of this type, however, incorporated in the gas line, as soon as the pressure recedes, to a dangerous degree, the gas is cut off automatically.

It is thought that by considering the description in connection with the drawings, a clear understanding of the construction and operation of the invention will be had, and therefore a more lengthy description is regarded unnecessary.

Minor changes in the size, shape and rearrangement of parts coming within the field of invention claimed may be resorted to, in actual practice, if desired.

I claim:

In a structure of the class described, an attachment for a globe like valve body comprising a tubular valve guide member, screw threaded at its opposite ends, a closure for one end including an outstanding screw threaded annular flange, a valve head slidable in said guide member and including a stem passing slidably through an opening in said closure, a vertically elongated casing threaded upon said flange, said valve stem extending into the casing, a pair of upstanding screw threaded rod members mounted on said flange and located in said casing, a cross head slidable on said stem and having its end portions adjustably connected with the screw threaded end portions of said rods, a spring surrounding the valve stem, a top flange on the valve stem with which one end of the spring is engageable, the opposite end of the spring being engageable with the central portion of said cross head.

In testimony whereof I affix my signature.

TED R. JAY.